Oct. 23, 1928.  
W. B. MURDEN  
STRAINER  
Filed Feb. 2, 1926
1,688,429
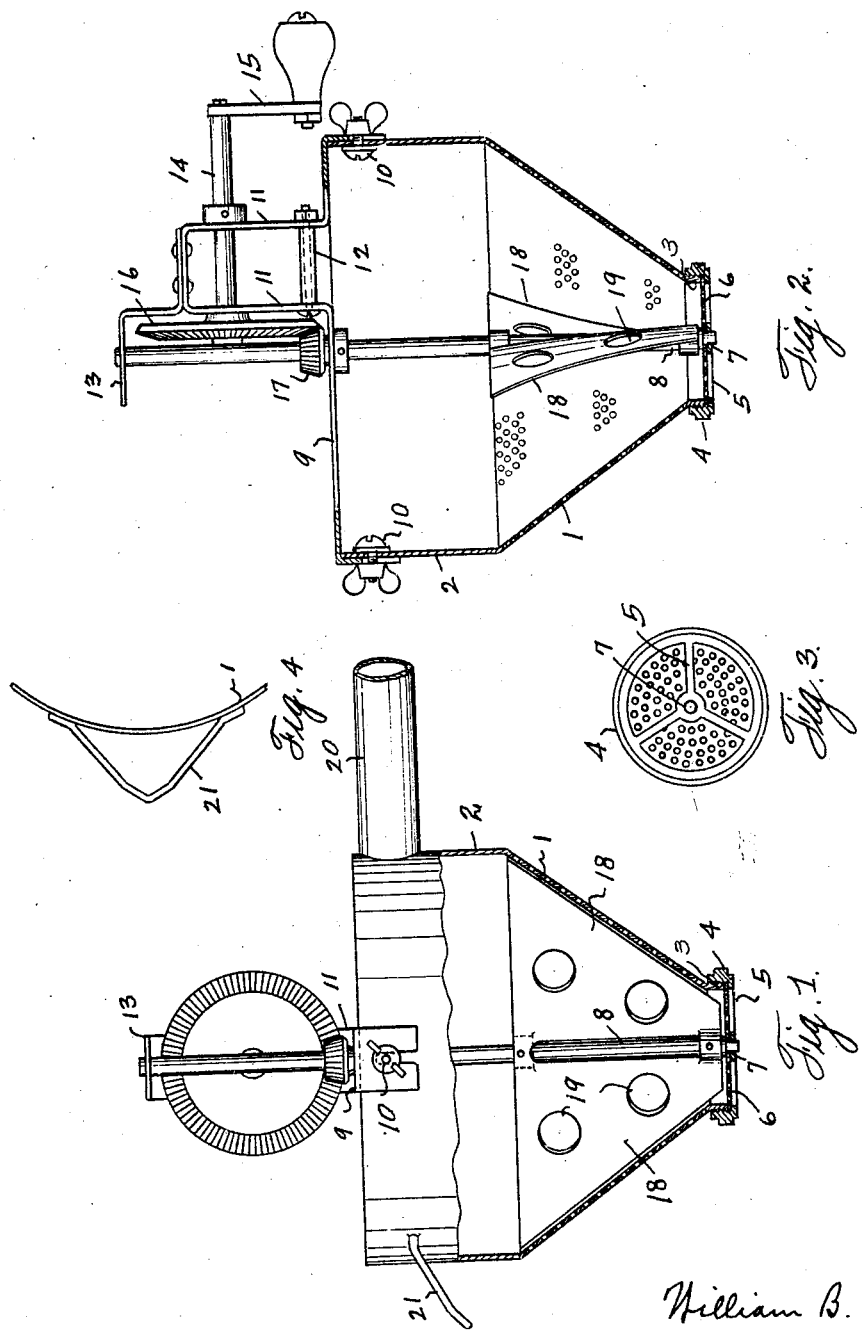
Inventor  
William B. Murden  
By Hardway & Cathy  
Attorneys Patented Oct. 23, 1928.

1,688,429

UNITED STATES PATENT OFFICE.

WILLIAM BADISON MURDEN, OF NEWARK, NEW JERSEY.

STRAINER.

Application filed February 2, 1926. Serial No. 85,418.

This invention relates to new and useful improvements in strainers.

One object of the invention is to provide a strainer specially designed for use in straining liquid ingredients of soups, and other liquid foods, into the cooker, and is of such construction that the straining operation may be easily and quickly accomplished.

Another object of the invention is to provide a strainer, of the character described, which is also adapted for general straining purposes.

With the above and other objects in view this invention has particular relation to certain novel features of construction, operation and arrangement of parts an example of which is given in this specification and illustrated in the accompanying drawings, wherein:—

Figure 1 shows a fragmentary side elevation of the device, partly in section.

Figure 2 shows a vertical sectional view thereof.

Figure 3 shows a bottom plan view of the lower end cap employed, and

Figure 4 shows a framentary plan view of the strainer.

Referring now more particularly to the drawings, wherein like numerals of reference designate similar parts in each of the figures the numeral 1 designates the strainer body which is formed of foraminated material and is of a general inverted conical shape. There is a comparatively wide rim of sheet metal 2 forming the upper part of the body and which may be formed integrally therewith, or soldered thereto.

There is an outwardly threaded, annular collar 3, soldered, or otherwise secured to the bottom of the body 1. There is a lower end cap 4, threaded onto the collar 3 and formed with a spider 5 which supports the foraminated plate 6, and is formed with a central bearing 7 to receive the lower end of the vertical paddle shaft 8. There is a bridge 9 which spans, and is secured to the top of the body 1. The ends of this bridge are downwardly turned to fit over the body and slotted to receive the clamp screws 10, 10, by means of which the bridge is detachably fastened to said body.

This bridge has an inverted U-shaped section forming the vertical spaced sides 11, 11, held in spaced relation by the tie rod 12. The paddle shaft 8 has a bearing in the bridge 9, and its upper end also has a bearing in the overturned lug 13 carried by said U-shaped section of the bridge.

Working in suitable aligned bearings of the sides 11, 11, there is a shaft 14, whose outer end has a crank 15 fixed thereon and whose inner end has a fixed bevel gear wheel 16 in mesh with a pinion 17 fixed on the paddle shaft 8.

Within the body 1 and fixed to the paddle shaft 8 are the oppositely disposed wings or paddles 18 whose outer edges converge downwardly, to sweep closely around the foraminated walls of said strainer body. These wings are slightly offset and their outer upper edges are curved forwardly so as to force the contents of the strainer downwardly toward the converging walls of the strainer body, as the wings, of paddles are rotated. These wings also have perforations 19 so that they will more rapidly mix the contents of the strainer.

The strainer has a suitable handle 20 and opposite it a catch 21. The handle serves its usual purpose, and, together with the catch serves as a support for the strainer on the cooking vessel during the straining operation.

What I claim is:—

1. A strainer including a receptacle whose walls are foraminated, a foraminated adjustable bottom for said receptacle having a central bearing, a removable bridge carried by the receptacle and having bearings aligned with said bottom bearing, a paddle shaft rotatably mounted in said bearings, paddles on said shaft, the upper portion of the outer edges of said paddles being forwardly curved, said bridge also having bearings in substantially right angular alignment with respect to said shaft, a crank shaft in said last named bearings, operatively connected with and adapted to drive the paddle shaft.

2. A strainer including a receptacle having foraminated walls, a bridge spanning said receptacle, a section of said bridge having a substantially inverted U-shape forming parallel sides provided with bearings, a crank shaft in said bearings, a paddle shaft disposed at right angles to said crank shaft, said bridge having a bearing in which said paddle shaft rotates, paddles fixed on said paddle shaft within the receptacle, said paddles being offset relative to each other and having the upper parts of their outer edges forwardly curved, intermeshing bevel gears fixed on the respective shafts and forming an operative connection between them.

3. A strainer including a receptacle having foraminated walls, a bridge spanning said receptacle, a section of said bridge having a substantially inverted U-shape forming parallel sides provided with bearings, a crank shaft in said bearings, a paddle shaft disposed at right angles to said crank shaft, said bridge having a bearing in which said paddle shaft rotates, a paddle fixed on said paddle shaft within the receptacle and the upper parts of whose edges are forwardly curved, intermeshing bevel gears fixed on the respective shafts and forming an operative connection between them, a removable foraminated bottom for the receptacle having a central bearing for the lower end of the paddle shaft.

In testimony whereof I have signed my name to this specification.

WILLIAM BADISON MURDEN.